Patented Oct. 16, 1934

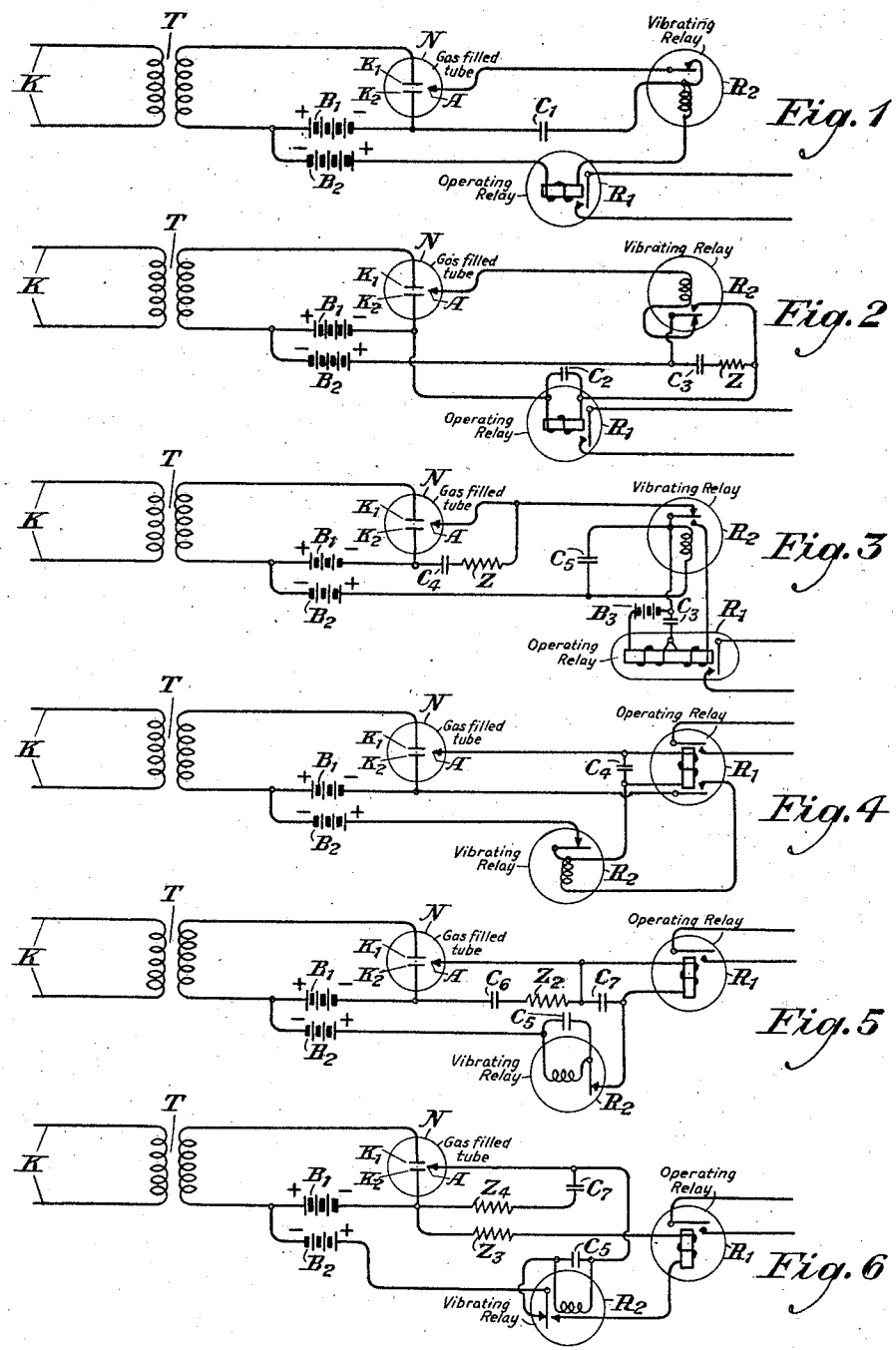

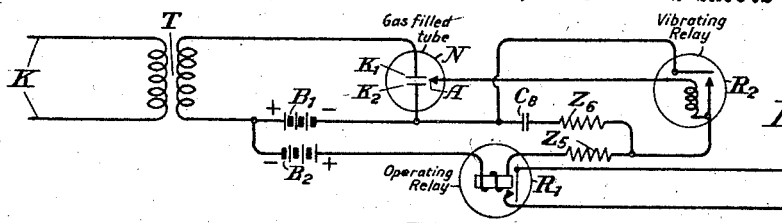
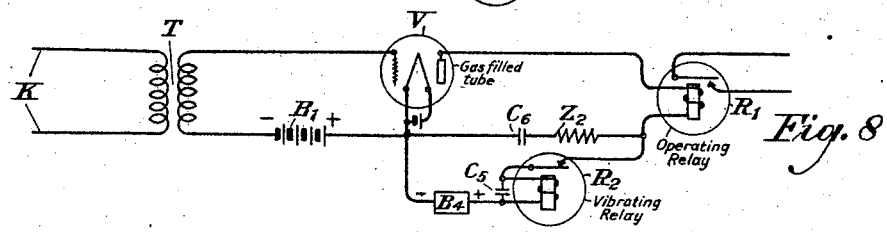
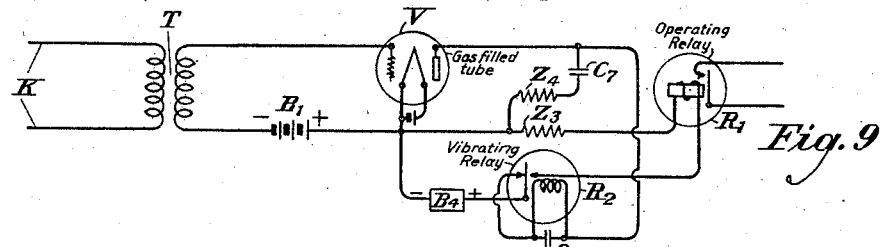
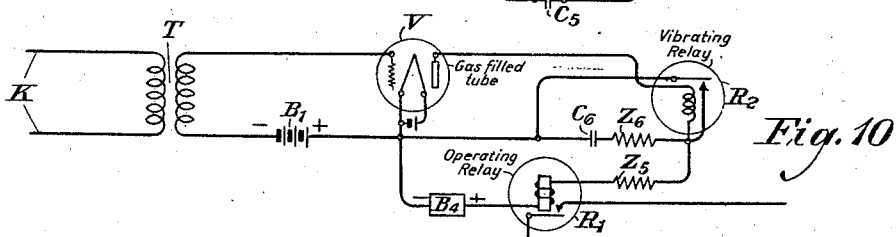
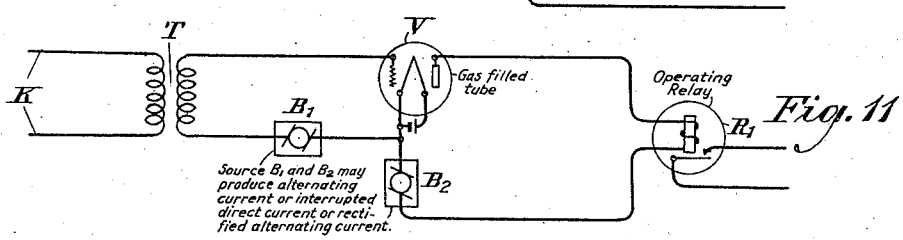
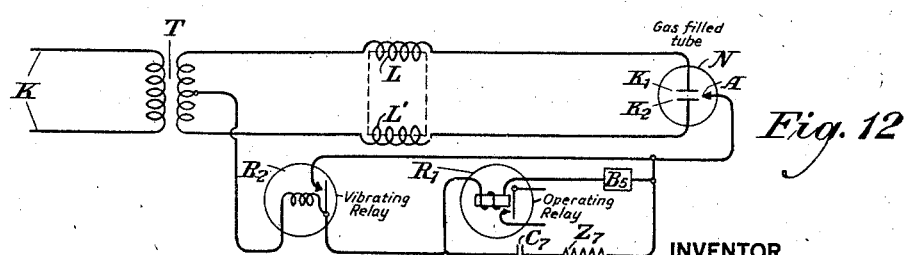

1,977,256

UNITED STATES PATENT OFFICE 1,977,256

RESETTING CIRCUITS FOR GAS FILLED TUBES

Leland Kasson Swart, Mountain Lakes, N. J., assignor to American Telephone and Telegraph Company, a corporation of New York Application March 17, 1933, Serial No. 661,412

18 Claims. (Cl. 175—320)

This invention relates to electrical circuits and to gas-filled tubes and to circuits for gas-filled tubes. More particularly, this invention relates to methods and apparatus for restoring gas-filled tubes after operation to their initial condition prior to operation. Stated in other words, this invention relates to methods and apparatus for unlocking operated gas-filled tubes.

When two or more electrodes are enclosed within a suitable vessel filled with a gaseous medium, the application of a voltage in excess of a predetermined value will ionize the gas within the tube and the gas will continue to remain ionized as long as a potential is applied between the electrodes which is above a certain lower predetermined value. If a direct potential remains impressed across the electrodes of the tube and if this direct potential is uninterrupted and of a value sufficient to continue ionization of the enclosed gas, the persistence of ionization makes it difficult, if not impossible, to operate the gas-filled tube as a relay for the control of associated circuits.

It is one of the objects of this invention to ionize the gas within gas-filled tubes and maintain the enclosed gas in an ionized condition as long as and only so long as a voltage impressed across the electrodes exceeds a predetermined value.

It is another object of this invention to ionize the gas contained by a tube when an impressed voltage exceeds a predetermined value, continue the ionization of the gas when the impressed voltage exceeds a second, lower predetermined value and restore the gas within the tube to its deionized condition immediately after the voltage impressed across the electrodes is below the second predetermined value.

Other and further objects of this invention will be better understood from the detailed description hereinafter when read in connection with the accompanying drawings in which Figs. 1–12 represent different embodiments of the invention.

Referring to Fig. 1 of the drawings, the reference character T indicates a transformer which may step voltages applied to the input circuit K to higher values or to lower values and the voltages are impressed upon the actuating electrodes $K_1$ and $K_2$ of the gas-filled tube N. The actuating electrodes $K_1$ and $K_2$ are arranged in series with a source of biasing potential designated $B_1$ and the potential of this biasing source $B_1$ serves to decrease the value of the voltage required to cause ionization of the gas between the actuating electrodes $K_1$ and $K_2$. If the tube N is of the cold cathode type, the value of biasing potential must be retained at a value which is less than that required to sustain the gaseous glow between the electrodes $K_1$ and $K_2$. If the potential of the biasing source exceeds that required to sustain the gaseous glow, then after ionization has taken place, current will continue to flow in the actuating circuit, this actuating circuit being defined by the secondary winding of the transformer T, electrodes $K_1$ and $K_2$ of tube N and the biasing source of potential $B_1$.

The secondary or work circuit of the tube N consists of the source of potential $B_1$, the source of potential $B_2$, the winding of an operating relay $R_1$, the winding of a vibrating relay $R_2$, the back contact and armature of vibrating relay $R_2$ and the anode A of the tube N, all of these elements being arranged in series relationship. The armature and contact of the operating relay $R_1$ are connected to a circuit which is controlled by this operating relay. A condenser $C_1$ is connected between the electrode $K_2$ of the tube N and the upper terminal of the winding of the vibrating relay $R_2$.

When the circuit K transmits through the transformer T, a voltage of sufficient magnitude which, when added to the potential of the biasing source $B_1$, causes the gas within the tube N to become ionized, the gas between the electrodes $K_1$ and $K_2$ will cause an immediate progressive ionization to occur in the work circuit of the tube N. This further ionization will reduce the impedance between the anode A and the electrodes $K_1$ and $K_2$ from that corresponding to an open circuit condition to a substantially low value. Current will then traverse the work circuit by virtue of the presence of the potential of the sources $B_1$ and $B_2$, the transmitted current taking the path which includes sources $B_1$ and $B_2$, the winding of operating relay $R_1$, the winding of vibrating relay $R_2$, the back contact and armature of the vibrating relay, the anode A of the tube N and the electrode $K_2$ of that tube. This current will be of sufficient magnitude to cause the operation of both relays $R_1$ and $R_2$.

The attraction of the armature of vibrating relay $R_2$ will open the work circuit which includes the back contact of the relay $R_2$ and therefore the potentials of the sources $B_1$ and $B_2$ will no longer be applied to the anode A of the tube N. Hence, the gas within the tube N will become de-ionized. Furthermore, the absence of current through the winding of relay $R_2$ will result in collapse of the magnetic field in the winding of this relay. The collapse of this magnetic field as well as the collapse of the magnetic field of the winding of the operating relay $R_1$ will produce a substantially high voltage which will be reduced by the condenser $C_1$ which becomes charged by this voltage.

The collapse of the magnetic field of the winding of the relay $R_2$ causes its armature to become released so as to close the back contact of this armature, whereupon the potentials of the sources $B_1$ and $B_2$, will again be applied to the anode A of the tube N. If the potential transmitted to the input or actuating circuit of the tube N is insufficient to cause or continue ionization of the gas between the electrodes $K_1$ and $K_2$ of that tube, the impedance between the anode A and the electrodes $K_1$ and $K_2$ will be substantially infinite and current will therefore fail to flow through the winding of the operating relay $R_1$ and the winding of the vibrating relay $R_2$. The circuit controlled by the armature of relay $R_1$ will be released, thereby opening the circuit controlled by this armature. If, however, a voltage of sufficient magnitude is transmitted through the transformer T to the input or actuating circuit of the tube N, the current will be reestablished in the output or work circuit of the tube N upon the closure of the back contact of the vibrating relay $R_2$ by its armature. The passage of current through the work circuit will again cause the vibrating relay $R_2$ to operate and at the same time current will flow through the winding of the operating relay $R_1$.

Thus, it will be seen that the armature of the vibrating relay $R_2$ vibrates during the period of ionization of the gas within the tube N which is occasioned by the application of a sufficiently high voltage between the electrodes or cathodes $K_1$ and $K_2$ of the tube N. The vibration of the armature of the relay $R_2$ ceases immediately after the potential applied between the electrodes $K_1$ and $K_2$ is insufficient to retain an ionized condition of the enclosed gas. The speed of vibration of the relay armature must be very high with respect to the time required to release the armature of the operating relay $R_1$ in order that the operating relay will not fall off during the period of vibration of the relay $R_2$.

Fig. 2 designates an arrangement similar to the one shown in Fig. 1. Here the output or work circuit of the tube N consists of the anode A of the tube N, its cathode $K_2$, sources $B_1$ and $B_2$, the armature of the vibrating relay $R_2$ and its back contact, and the winding of the vibrating relay $R_2$. A circuit associated with the work circuit of the tube N consists of the winding of the operating relay $R_1$, the forward contact and armature of the vibrating relay $R_2$ and sources $B_2$ and $B_1$.

The voltage transmitted through the transformer T and applied between the electrodes $K_1$ and $K_2$ of the gas-filled tube N, if of sufficient magnitude, will cause ionization of the gas within the tube, and the impedance between the various electrodes will be reduced from a substantially infinite value corresponding to an open circuit condition to a low and finite value. Current will then flow from the sources $B_1$ and $B_2$ through the armature and back contact of the vibrating relay $R_2$ through the winding of the vibrating relay $R_2$ and the anode A and electrode $K_2$ of the tube N. This current will attract the armature of the vibrating relay $R_2$ and it will then close its forward contact. The closure of the latter contact will cause current to flow through the winding of the operating relay $R_1$ through the circuit including this winding, which circuit has been described hereinabove. Moreover, the condenser $C_2$, which shunts the winding of the operating relay $R_1$, will be supplied with charging current from the sources $B_1$ and $B_2$.

The flow of current from the sources $B_1$ and $B_2$ through the winding of the operating relay $R_1$ will cause an armature of the latter relay to become attracted, thereby closing the circuit controlled by that armature. Also, the closure of the forward contact by the armature of the vibrating relay $R_2$ will withdraw the potential of sources $B_1$ and $B_2$ from the anode A of the tube N as well as from the winding of the vibrating relay, thereby causing the armature of the vibrating relay to release from its forward contact to its back contact. The release of the armature of the vibrating relay $R_2$ from its forward contact also eliminates the flow of current through the winding of the operating relay $R_1$ although the condenser $C_2$ discharges through the winding of the operating relay and thereby tends to hold that relay in its operating condition. Upon the closure of the back contact of the vibrating relay $R_2$, the potential of sources $B_1$ and $B_2$ will again be restored to the anode A of the tube N.

If the gas within the tube N is still non-ionized or de-ionized because of the absence of sufficient potential obtained through the transformer T from the input circuit K, the vibrating relay $R_2$ will not operate again and moreover, after the condenser $C_2$ has become discharged through the winding of the operating relay $R_1$, the armature of the operating relay will be released to its non-operated position. If, however, the armature of the vibrating relay $R_2$ is on its back contact and the gas within the tube N is or remains in an ionized condition due to the presence of sufficient voltage between the electrodes $K_1$ and $K_2$ of that tube, the low impedance between the anode A and the electrode $K_2$ of the tube N will permit current again to flow from sources $B_1$ and $B_2$ through the armature and back contact of the vibrating relay $R_2$ and through the winding of the vibrating relay to the anode A of the tube N and from this anode A through the ionized gas within the tube to the electrode $K_2$. This flow of current will again cause the armature of the vibrating relay to leave its back contact and again make its forward contact, causing the condenser $C_2$ to be again charged. Moreover, the armature of the operating relay $R_1$ will again be attracted so as to close the circuit controlled by this armature. Thus it will be seen that the vibrating relay $R_2$ will continue to vibrate at a high speed as long as the gas within the tube N remains ionized by virtue of sufficient voltage between the electrodes $K_1$ and $K_2$ and, moreover, the armature of the operating relay will remain attracted during the period of time that the vibrating relay continues to vibrate. However, immediately after the disappearance of ample voltage between the electrodes $K_1$ and $K_2$ of the tube N, the vibrating relay will cease its vibration and the circuits will be restored to their non-operated condition.

The condenser $C_3$ and the resistance Z are connected in series relationship across the armature and forward contact of the vibrating relay $R_2$ and absorb the "kick" potential produced by the decay in the magnetic field within the winding of the operating relay $R_1$ which is caused by the withdrawal of current from that winding when the armature of the vibrating relay $R_2$ leaves its forward contact.

Fig. 3 shows an arrangement somewhat like those of Figs. 1 and 2. The work circuit of this arrangement consists of sources $B_1$ and $B_2$, the winding of the vibrating relay $R_2$, its armature and back contact, and the anode A and electrode $K_2$ of the tube N. The circuit controlled by the armature and front contact of the vibrating relay consists of the source $B_3$, the winding of the operating relay $R_1$ and the armature and front contact of the vibrating relay $R_2$. A condenser $C_3$ is connected between one terminal of the source $B_3$ and some point on the winding of the operating relay $R_1$, as shown. The armature and contact of the operating relay $R_1$ control an associated circuit.

If the gas within the tube N becomes ionized by virtue of the presence of a sufficiently high potential between the electrodes $K_1$ and $K_2$, the impedance between the anode A and the cathode $K_2$ will be reduced from an open circuit condition or infinite value to a low and practically negligible value, thereby permitting current to pass from the sources $B_1$ and $B_2$ through the winding of the vibrating relay $R_2$, through the armature and back contact of the vibrating relay $R_2$, and then through the gas between the anode A and the electrode $K_2$ of the tube N. This current will cause the armature of the vibrating relay $R_2$ to leave its back contact and close its forward contact, thereby bringing about the operation of the relay $R_1$, current being supplied to the winding of the relay $R_1$ from the source $B_3$ and over the circuit which includes the armature of the vibrating relay $R_2$ and its front contact. The operation of the relay $R_1$ will cause a partial discharge of the condenser $C_3$. Upon the opening of the back contact of the relay $R_2$ the potential of sources $B_1$ and $B_2$ is withdrawn from the anode A of the tube N, permitting the gas within that tube to become de-ionized, and moreover, the current through the winding of the vibrating relay $R_2$ will be reduced to a negligible value. This will permit the armature of the vibrating relay $R_2$ to be moved to its back contact so that, if the gas within the tube N remains in a de-ionized condition, current will be unable to flow through the winding of the vibrating relay $R_2$ by virtue of the infinite impedance existent between the anode A and the electrode $K_2$ of the tube N. At the same time the condenser $C_3$ will become recharged by the source $B_3$ and the operating relay $R_1$ will be released.

However, if the armature of the vibrating relay $R_2$ is on its back contact and the gas within the tube N becomes ionized or remains ionized by virtue of the impression of a sufficiently high potential between the electrodes $K_1$ and $K_2$ of the tube N, the vibrating relay will again attract its armature so as to close its forward contact. The reclosure of this forward contact will permit current to be supplied from the source $B_3$ through the winding of the operating relay $R_1$ and at the same time the condenser $C_3$ will be again partially discharged. As long as the gas within the tube N remains in an ionized condition, the armature of the relay $R_2$ will be in vibration at a high periodicity and the armature of the operating relay $R_1$ will remain continuously attracted so as to close the circuit connected between that armature and its contact. Immediately after the gas within the tube N becomes de-ionized, the armature of the relay $R_2$ will cease its vibration and the operating relay $R_1$ will be released.

The condenser $C_4$ and the impedance Z act to absorb the "kick" voltage produced upon the opening of the contact and armature of the relay $R_2$. They also aid in de-ionizing the gas within the tube N.

The condenser $C_5$ serves to control the period of vibration of the armature of the relay $R_2$. This condenser supplies current to the winding of the relay $R_2$ for a brief period of time after its armature has left its back contact. This additional current will assure a complete breaking of the circuit of the back contact at the armature of relay $R_2$ and thereby further assure the periodic removal of operating potential from the anode A of tube N.

Fig. 4 shows another arrangement for restoring the gas within the tube N to a de-ionized condition immediately after the potential supplied between the electrodes $K_1$ and $K_2$ is reduced below a predetermined value. The work circuit of this arrangement consists of the sources $B_1$ and $B_2$, the bank contact of the vibrating relay $R_2$ and its armature, the winding of the operating relay $R_1$ and the anode A and the electrode $K_2$ of the tube N. A condenser $C_4$ is connected in shunt with the winding of the relay $R_1$.

When the gas within the tube N becomes ionized, current will flow from the sources $B_1$ and $B_2$ through the winding of the operating relay $R_1$ over the circuit above described, said circuit including the armature and back contact of the vibrating relay $R_2$. The voltage drop across the winding of the relay $R_1$ will cause the condenser $C_4$ to become charged. Upon the operation of the relay $R_1$, its upper armature and contact will close the circuit associated therewith. Upon the attraction of the lower armature of the relay $R_1$, current will be allowed to flow from the sources $B_1$ and $B_2$ through the back contact and armature of the vibrating relay $R_2$, through the winding of the vibrating relay $R_2$, and through the lower armature of the relay $R_1$ and its contact. This current will cause the armature of the vibrating relay $R_2$ to be withdrawn from its back contact, thereby withdrawing the potential of the sources $B_1$ and $B_2$ from the anode A of the tube N. Consequently, the gas within the tube N will be permitted to de-ionize unless the voltage transmitted from the input circuit K through the transformer T to the electrodes $K_1$ and $K_2$ is sufficiently large so as to maintain the gas within the tube N ionized. Furthermore, the release of the back contact of the vibrating relay $R_2$ will prevent the flow of current from the sources $B_1$ and $B_2$ through the winding of the vibrating relay $R_2$. The armature of the vibrating relay may thereafter again close its back contact so as to permit the potential of sources $B_1$ and $B_2$ to become again impressed upon the anode A of the tube N. If at that time the path within the tube between the anode A and the electrode $K_2$ is in an open circuit condition or in other words of infinite impedance, due to the absence of a sufficiently high potential between the electrodes $K_1$ and $K_2$, no current will then flow between the anode A and the electrodes $K_2$ of the tube N, and moreover, the relays $R_1$ and $R_2$ will both be released. The relay $R_1$ will be released immediately after the condenser $C_4$ has become sufficiently discharged. If, however, the impedance between the anode A and the electrode $K_2$ becomes reduced to a low value, the armature of the vibrating relay will again be attracted and the relay $R_1$ will be again operated. It will be noted again that the vibrating relay $R_2$ operates and maintains its armature in continuous vibration and that the relay $R_1$ becomes operated and remains operated as long as a sufficiently high voltage is transmitted to the electrodes $K_1$ and $K_2$ of the tube N, and that these relays will be released almost instantly after the necessary high voltage is removed from the electrodes $K_1$ and $K_2$.

In Fig. 5 the work circuit consists of the anode A and the electrode $K_2$ of the tube N, the sources $B_1$ and $B_2$, the winding of the vibrating relay $R_2$, its armature and back contact, and the winding of the operating relay $R_1$. When the gas within the tube N becomes ionized by virtue of the presence of a sufficiently high voltage between the electrodes $K_1$ and $K_2$, current will flow through the circuit just described, causing the armature of the vibrating relay $R_2$ to be withdrawn from its back contact. This will remove the potential of sources $B_1$ and $B_2$ from the anode A of the tube N. At the same time the relay $R_1$ will become operated, thereby attracting its armature and closing the circuit connected between that armature and its forward contact. The condenser $C_5$, which bridges the winding of the vibrating relay $R_2$, will be charged by the current which flows toward the winding of the operating relay $R_1$.

Soon after the armature of the vibrating relay has left its back contact, it will be restored to this back contact and the potential of sources $B_1$ and $B_2$ will be again applied between the anode A and the electrode $K_2$ of the tube N. If the gas within this tube is de-ionized because of the absence of sufficient potential between the electrodes $K_1$ and $K_2$, the armature of the vibrating relay $R_2$ will not be attracted and current will no longer flow through the winding of the operating relay $R_1$ due to the absence of ionized gas between the anode A and the electrode $K_2$ of the tube N which are in series therewith. The release of the armature of the operating relay $R_1$ will open the circuit connected between this armature and its forward contact. If, however, the gas within the tube N remains ionized, the closure of the back contact of the armature of the vibrating relay $R_2$ will permit current to be again supplied to the winding of the operating relay $R_1$ so as to retain its armature closed against its forward contact. Further release of the back contact of the vibrating relay $R_2$ will again withdraw the potential of sources $B_1$ and $B_2$ from the anode A of the tube N, and if the gas within this tube is still ionized, the armature of the relay $R_2$ will continue to vibrate as long as the gas within the tube N remains ionized, and during this entire interval the operating relay $R_1$ will hold its armature closed against its forward contact. Immediately after the relay $R_2$ stops vibrating, the operating relay $R_1$ will become released and remain released until the relay $R_2$ again is vibrated.

The function of the condenser $C_5$ is to maintain a supply of current to the winding of the relay $R_2$ for a brief period of time after its armature has left its back contact. This additional current will assure a complete breaking of the circuit at the back contact of the armature of the vibrating relay $R_2$.

The function of the condenser $C_6$ and impedance $Z_2$, which may be a small resistance, both of which are connected in shunt with the anode A and the electrode $K_2$ of the tube N, as shown, is to aid in de-ionization of the tube by suppressing the "kick" voltage caused by the rapid decay of current in the winding of the vibrating relay $R_2$ upon the opening of the circuit of this winding at the back contact of its armature. The inductive "kick" which occurs immediately after the circuit of the winding of the vibrating relay $R_2$ becomes opened, will generally of itself be sufficient to re-ignite or reionize the gas within the tube N if the series condenser $C_6$ and the impedance $Z_2$ were not connected as shown. Condenser $C_7$ holds the relay $R_1$ operated for a brief time interval so that the armature of the operating relay $R_1$ will not leave its forward contact while the relay $R_2$ is in vibration. If the forward contact of the operating relay $R_1$ were opened during the vibration of the relay $R_2$, the circuit controlled by the armature of the operating relay would be released at the very time when it should be closed.

The work circuit of Fig. 6 consists of the anode A and the electrode $K_2$ of the tube N, sources $B_1$ and $B_2$, the armature of the vibrating relay $R_2$ and its back contact, and the winding of the vibrating relay $R_2$. When the gas within the tube N becomes ionized by virtue of the transmission of a sufficiently high voltage from the input circuit K, the armature of the vibrating relay $R_2$ will become attracted so as to close its forward contact and the potential of sources $B_1$ and $B_2$ will no longer be applied to the anode A of the tube N.

The closure of the forward contact of the vibrating relay $R_2$ causes the relay $R_1$ to become operated, current flowing from the sources $B_1$ and $B_2$ over the armature and forward contact of the vibrating relay $R_2$, the winding of the operating relay $R_1$ and the impedance or resistance $Z_3$. The closure of the contact of the operating relay $R_1$ will actuate the circuit connected between the armature of the operating relay $R_1$ and its contact.

The condenser $C_7$ and the impedance $Z_4$ are connected in a series circuit which shunts the anode A and the electrode $K_2$ of the tube N. The condenser $C_7$ is charged when the potential of sources $B_1$ and $B_2$ is applied to the anode A of the tube N, and this condenser becomes discharged imediately after the potential of the sources is withdrawn from the anode A.

Soon after the forward contact of the vibrating relay $R_2$ has become closed, this contact will be opened and the armature of this relay will close its back contact. This will again permit the application of the potential of sources $B_1$ and $B_2$ to the anode A of the tube N, and the condenser $C_7$ will be again charged. If the gas within the tube N remains ionized, the armature of the vibrating relay $R_2$ will be attracted so as to again close its forward contact, thereby releasing the potential from the anode A of the tube N and, at the same time, the condenser $C_7$ will be discharged. Current will also flow through the winding of the operating relay $R_1$, this current being supplied by the sources $B_1$ and $B_2$, and passing over the armature and forward contact of the relay $R_2$, as well as over the impedance $Z_3$. In the absence of ionization within tube N, the relay $R_2$ will cease to vibrate its armature and the relay $R_1$ will release its armature so as to open the attached circuit. As in all other cases described hereinabove, the armature of the vibrating relay $R_2$ will start vibration and remain in vibration and the relay $R_1$ will attract its armature and that armature will remain attracted as long as sufficient voltage is transmitted from the input circuit K through the transformer T to the electrodes $K_1$ and $K_2$ of the tube N. Immediately after the reduction of this voltage below the value required to sustain ionization within the tube N, the relay $R_2$ will cease to vibrate its armature and the relay $R_1$ will become released.

As in Fig. 5 the condenser $C_5$, which bridges the winding of the vibrating relay $R_2$, continues a supply of current to the winding of the vibrating relay for a short period of time after its armature has left its back contact and thereby assures a sufficiently high magneto motive force to bring about the closure of the forward contact of the vibrating relay $R_2$ by its armature.

The condenser $C_7$ and the series impedance $Z_4$, which may be a small resistance, are employed for the purpose of preventing reionization of the gas within the tube N by virtue of the inductive "kick" produced merely by the making and breaking of the circuit which includes the winding of the vibrating relay $R_2$. This inductive voltage "kick" is transmitted through the impedance $Z_4$ to charge the condenser $C_7$, and if these elements were not interposed in the circuit, this voltage "kick" would be directly impressed between the anode A and the electrode $K_2$ of the tube N.

In Fig. 7 the reduction in the impedance of the gas from an open circuit condition to a finite low impedance enclosed within the tube N will cause the flow of current through the work circuit which includes the sources $B_1$ and $B_2$, the winding of the operating relay $R_1$, the impedance $Z_5$, the winding of the vibrating relay $R_2$, and the anode A and the electrode $K_2$ of the tube N. The flow of current through the circuit just described will operate the device or circuit connected between the armature and contact of the operating relay $R_1$. The same current will cause the armature of the vibrating relay $R_2$ to be attracted so as to close its associated contact. Inasmuch as the condenser $C_8$ and the impedance $Z_6$ are connected in series with each other across the armature and contact of the vibrating relay $R_2$, the condenser $C_8$ will be discharged through the impedance $Z_6$ when the armature and contact of relay $R_2$ are closed. The closure of the contact of the vibrating relay $R_2$ reduces the potential applied to the anode A of the tube N to a practically negligible value. Consequently the gas within the tube N will become de-ionized.

When the contact of the vibrating relay $R_2$ is closed, the lack of current through its winding, will promptly cause the armature of the vibrating relay $R_2$ to open its contact. Just as soon as this contact becomes opened, the potential of sources $B_1$ and $B_2$ will again be applied to the anode A of the tube N, and moreover, current will flow from the sources $B_1$ and $B_2$ through the winding of the operating relay $R_1$, the impedance $Z_5$, the impedance $Z_6$, and the condenser $C_8$. The current through the latter circuit will tend to maintain the relay $R_1$ operated for a short period of time, i. e., the time required to charge condenser $C_8$.

If the gas within the tube N is in an ionized condition when the potential of sources $B_1$ and $B_2$ is restored to the anode A of the tube N, a condition which may be brought about by the application of a sufficiently high voltage between the electrodes $K_1$ and $K_2$ of the tube N, current will then continue to flow from sources $B_1$ and $B_2$ through the windings of the relays $R_1$ and $R_2$. Consequently the armature of the operating relay $R_1$ will be held against its contact and the armature of the vibrating relay $R_2$ will be attracted to its contact. It will be obvious, therefore, that during the ionization of the gas within the tube N, the relay $R_2$ will vibrate its armature at a high speed, alternately charging and discharging the condenser $C_8$, and moreover, applying interrupted direct current to the winding of the operating relay $R_1$. It will be noted that the speed of vibration of the relay $R_2$ is so high that the armature of the operating relay $R_1$ will have insufficient time to leave its contact during the interval of time between successive closures of the contact of the vibrating relay $R_2$ and charge and discharge of condenser $C_8$ and, therefore, the circuit controlled by the operating relay $R_1$ will remain closed as long as the armature of the vibrating relay $R_2$ is vibrated.

If, however, when the armature of the vibrating relay $R_2$ leaves its contact to restore the potential of the sources $B_1$ and $B_2$ to the anode A of the tube N, and the gas within the tube N is de-ionized by virtue of the absence of sufficient potential between the electrodes $K_1$ and $K_2$, current will cease to flow through the windings of the relays $R_1$ and $R_2$. The armature of the relay $R_1$ will therefore be released to its non-operated position and open the circuit controlled by this armature.

The condenser $C_8$ and the impedance $Z_6$ function to suppress the voltage which would otherwise be applied to the anode A of the tube N immediately after the opening of the contact of the vibrating relay $R_2$. The voltage just referred to is produced by a sudden decay of the magnetic field within the winding of the operating relay $R_1$ which results from the reduction in the flow of current from sources $B_1$ and $B_2$ through the winding of the relay $R_1$ immediately after the contact of the vibrating relay has been opened. If this voltage were not substantially suppressed by the condenser $C_8$ and the impedance $Z_6$, it will cause the gas within the tube N to become ionized between the anode A and the electrode $K_2$. The condenser $C_8$ is of a relatively large capacity and the impedance $Z_6$ is preferably a resistance of small magnitude in order to dissipate the charge of condenser $C_8$. It will be evident that if the condenser $C_8$ and the impedance $Z_6$ were not connected to the circuit, it would be virtually impossible to restore a gas tube of the cold cathode type to its de-ionized condition at the high speed of vibration of the armature of the relay $R_2$.

Fig. 8 shows an arrangement somewhat similar to the one shown in Fig. 5. Fig. 8, however, employs, instead of a cold cathode gas-filled tube, a heated cathode gas-filled tube which is designated V. When employing a heated cathode gas-filled type of tube, it is essential that the potential used to bias the grid electrode G with respect to the filament F of the tube V be poled negatively, as shown by the positive and negative signs at the terminals of the source $B_1$ shown in Fig. 8, rather than positively, as shown in Fig. 5. It is also essential that the biasing source of potential $B_1$ be separate and distinct from the source of potential used to energize the work circuit of the tube. It will therefore be seen that the source $B_1$ does not supply the current required to operate the relays $R_1$ and $R_2$, the necessary current for the operation of these relays being supplied by the source $B_4$ above. So it will be seen that when a cold cathode type of tube is employed, as in Fig. 5, a portion of the potential which supplies energy to operate the relays of the work circuit may be used to provide the necessary bias for the electrode which, in the first instance, transmits the high voltage required for ionization of the gas within the tube.

Fig. 9 shows an arrangement which in many respects is similar to the one shown in Fig. 6. Fig. 9 replaces the cold cathode gas-filled tube N of Fig. 6 with the hot cathode gas-filled tube V which includes three electrodes, namely, the grid G, the filament F, and the anode A. A separate source of potential is required in this case, as in the arrangement shown in Fig. 8, in order to properly bias the grid electrode G to a suitable negative potential with respect to the filament F. The source $B_4$ alone supplies the current required to energize the windings of the relays $R_1$ and $R_2$.

Fig. 10 is in many respect similar to Fig. 7, the cold cathode gas-filled tube N being replaced by the hot cathode gas-filled tube V, which also includes three electrodes, the grid being designated G, the filament or cathode F, and the anode A. As in the cases of Figs. 8 and 9, a separate source of potential $B_1$ is required to suitably bias the grid electrode G with respect to the filament or cathode F, and this source $B_1$ is poled in a direction which is opposite to the direction in which the source $B_1$ of Fig. 7 is poled. It will again be noted that the source $B_4$ alone supplies the current required to energize the windings of the relays $R_1$ and $R_2$.

Fig. 11 shows an arrangement which may be generally applied for operating gas-filled tubes either of the hot cathode type or of the cold cathode type, the hot cathode type being shown merely for the sake of illustration. The hot cathode tube V includes three elements, a grid G, a filament or cathode F, and an anode A, but it will be understood that the tube V may be replaced by any of the tubes of the cold cathode type which are designated N in the drawings and which include three electrodes designated $K_1$, $K_2$ and A. If the cold cathode tube N is substituted for the hot cathode tube V, it will be obvious that the electrodes $K_1$ and $K_2$ will be connected to the terminals which extend to the grid electrode G and the filament or cathode F respectively, and that the anode A will occupy the same position in both types of circuits.

The transformer T couples the input circuit K with the actuating electrodes G and F of the tube V, the secondary winding of the transformer T being connected between these electrodes through a source of potential designated $B_1$, which may be of any well known source of alternating current, or any well known source of interrupted direct current, or a source of direct current having a voltage which is less than that required to sustain the glow between the electrodes G and F of the tube V.

The output or work circuit consists of the source of potential $B_2$, the winding of the operating relay $R_1$, and the anode A and filament or cathode F of the tube V. The source $B_2$ may be any source of alternating current or any source of interrupted direct current, and moreover, if the operating relay $R_1$ is of the alternating current type, the source of potential $B_2$ will be one of alternating current. If, however, the source of potential $B_2$ is one which transmits an interrupted direct current, then the operating relay $R_1$ may be of any well known direct current type. The operating relay $R_1$ may simply be considered as any well known electrical translating device which is connected between the anode A of the tube V and the source of potential $B_2$. The source of potential $B_2$ or $B_1$ may be a combination of uninterrupted or interrupted direct current with alternating current.

If the source $B_2$ is an alternating potential having a period which is less than the time required for de-ionizing the gas within the tube V, the gas within the tube will be de-ionized once for each alternation of the potential of the source $B_2$. Thus, if the source $B_2$ be one of alternating current of sufficiently high frequency, the gas within the tube N will be de-ionized twice during each complete cycle. It follows, therefore, that the operating relay $R_1$ will be restored to its normal unoperated condition almost immediately after the voltage applied between the electrodes G and F has been reduced below a predetermined value required to continue the ionization of the gas within the tube V, if the source $B_2$ is one of sufficiently high frequency.

If the source $B_2$ is of the interrupted direct current type and the period of interruption is equal to or greater than the de-ionizing time of the gas between the electrodes A and F of the tube V, the work circuit of the tube will be restored to its unoperated condition almost immediately after the withdrawal of potential between the electrodes G and F of the tube V. Thus any translating device connected between the source of potential $B_2$ and the anode A can be restored to its normal and unoperated condition if the source $B_2$ is an alternating current of sufficiently high frequency or a direct current which is interrupted at a sufficiently high frequency and the periods of operation of the relay $R_1$ will correspond almost exactly to the periods of application and withdrawal of potential of sufficient magnitude between the electrodes G and F of the tube V.

The period of interruption of the source $B_2$ or its frequency may lie within the range of audibility or above the range of audibility, the only requirement being that its period be greater than the time for de-ionizing the gas between the anode A and the cathode or filament F of the tube V. It will be understood that the source $B_2$, if intended to provide interrupted direct current, may consist of any well known type of interrupter (not shown), which is connected in series with a source of direct current such as a storage battery. This interrupted direct current may serve as a common source for a number of work circuits similar to the one shown in the drawings. In that case the common source will be connected to the various relays and the corresponding electrodes designated A and F of each tube in parallel paths.

If the source $B_2$ is intended to produce an alternating current potential, that potential may be supplied by any well known form of oscillator or generator which may, for example, be of the vacuum tube type. If the operating relay $R_1$ is a direct current device, the source of alternating current may be connected or coupled to a rectifying device of any well known type and the rectified current may be transmitted through the winding of the operating relay $R_1$ and between the anode A and the filament or cathode F of the tube V.

In Fig. 12, the circuit K transmits a direct current of either polarity or, more usually, an alternating current of any frequency. The secondary winding of the transformer T is connected to the electrodes $K_1$ and $K_2$ of the tube N through the choke coils L and L', as shown.

The choke coils L and L' may be two equal portions of a single winding or they may be separate windings having the same number of turns, and furthermore, it is preferable that they be wound upon a common core of iron. These windings are so poled that if a voltage were impressed in series with them, their inductive reactances would be a maximum. If, however, the potential impressed in series with these windings tends to produce inductive reactances which are not only equal in magnitude but opposite in effect, the effective impedance of the two coils will then be merely that corresponding to their resistance.

The anode A of the tube N is connected to the mid-point of the secondary winding of the transformer T through a circuit which includes the winding of the vibrating relay $R_2$, the winding of the operating relay $R_1$ and the source of potential $B_5$ which may be a storage battery. The source $B_5$ biases both of the electrodes $K_1$ and $K_2$ equally with respect to the anode A.

A condenser $C_7$ and an impedance $Z_7$ are connected in series with each other across the circuit formed by the winding of the operating relay $R_1$ and the source of potential $B_5$. The condenser $C_7$ absorbs the voltage "kick" produced by the periodic decay of the current through the winding of the relay $R_1$. Moreover, this condenser supplies the current which maintains the relay $R_1$ operated while the armature of the relay $R_2$ is in vibration.

Upon each vibration of the armature of relay $R_2$, its contact is closed so as to shunt the source of potential $B_5$, the shunt circuit including the winding of the operating relay $R_1$ and the armature and contact of the relay $R_2$. When this shunt circuit is closed, the potential of the source $B_5$ will be effectively removed from the anode A of the tube N. Upon the opening of this shunt circuit at the contact of the relay $R_2$, the potential of source $B_5$ will be again applied to the anode A.

The circuit of Fig. 12 is one for the operation of the tube N and the associated relays during both halves of the cycle of voltage impressed upon the circuit K. The tube N includes two gaps between each of the respective electrodes $K_1$ and $K_2$ and the anode A and these gaps are alternately discharged during the two opposite halves of each cycle of impressed voltage which exceeds a predetermined value.

While this invention has been shown and described in certain particular arrangements merely for the purpose of illustration, it will be understood that the general principles of this invention may be applied to other and widely varied organizations without departing from the spirit of the invention and the scope of the appended claims.

What is claimed is:

1. The combination of a gas-filled tube having three electrodes, means responsive to a voltage exceeding a predetermined value impressed upon two of the electrodes of the tube for ionizing the gas within the tube, a vibrating relay having a winding connected between the third electrode of the tube and one of the other electrodes, means for vibrating the armature of said relay as long as the gas within the tube remains ionized, a translating circuit, and means for operating the translating circuit and maintaining it operated as long as the armature of said relay continues in vibration.

2. The combination of a gas-filled tube having three electrodes, means responsive to a voltage exceeding a predetermined value impressed upon two of the electrodes for ionizing the gas within said tube, a source of potential connected between the third electrode of the tube and one of its other electrodes, and means for periodically breaking the circuit between said source of potential and the third electrode of the tube, each break of said circuit removing the potential of said source from the third electrode of the tube so that the gas within the tube may become de-ionized.

3. The combination of a gas-filled tube having an input circuit and an output circuit, means coupled to the input circuit of said tube for initiating ionization of the gas within said tube, means for periodically interrupting the output circuit of said tube, each interruption being for a period of time which is greater than the time for de-ionizing the gas within said tube, and means for absorbing the high voltage kick produced by each periodical interruption of the output circuit of the tube.

4. The combination of a gas-filled tube having three electrodes, a circuit connected to two of the electrodes of said tube, the gas within said tube becoming ionized when the potential transmitted by said circuit exceeds a predetermined value, a source of interrupted direct potential connected between the third electrode of the tube and one of the other electrodes, the period of interruption of said source being greater than the time required for de-ionizing the gas within the tube, and means for absorbing the high voltage kick produced by each interruption of said source of potential connected between the third electrode of the tube and one of the other electrodes.

5. The combination of a gas-filled tube having two cathodes and an anode, a circuit connected to the two cathodes of said tube, the gas within the tube becoming ionized when said circuit transmits a potential exceeding a predetermined value, a source of potential, a vibrating relay, the winding of which is connected in series with said source of potential between the anode and one of the cathodes of said tube, and means controlled by the armature of the vibrating relay for opening the circuit between said source of potential and the anode of said tube, the period of vibration of the armature of said relay being greater than the time for de-ionizing the gas within the tube.

6. The combination of a gas-filled tube having two cathodes and an anode, first and second sources of potential, a vibrating relay, an operating relay, a condenser of large capacity, and a resistance of small magnitude connected in series with said condenser, the first source of potential being connected between the two cathodes of the tube, the windings of both relays being connected in series with both sources of potential and the anode and one of the cathodes of the tube, the armature and contact of the vibrating relay being connected in shunt with said condenser and said resistance, said resistance and said condenser being also connected in shunt with the winding of the operating relay and both sources of potential.

7. The combination of a gas-filled tube having two activated electrodes and an anode, means responsive to voltages exceeding a predetermined value impressed across the activating electrodes of the tube for ionizing the gas within the tube, an operating relay, a vibrating relay, a source of potential, the windings of both relays and the source of potential being connected in series with each other and in series with the anode and one of the activated electrodes of the tube, the armature and contact of the vibrating relay being connected across the circuit which includes the latter activating electrode of the tube and the winding of the vibrating relay, and means for suppressing the voltage produced by any decay of the current flowing in the circuit which includes the windings of both relays.

8. The combination of a cold cathode gas-filled tube including at least three electrodes one of which is an anode, means responsive to a voltage exceeding a predetermined value impressed upon two of the electrodes of said tube for initiating ionization of the gas within said tube, a source of applying potential to the anode of said tube for aiding in sustaining gaseous ionization within the tube, means for periodically interrupting the application of the potential of said source to the anode of said tube so that gaseous ionization may be sustained within the tube during each interruption only by said voltage responsive means, and means for reapplying the potential of said source to said anode immediately after the voltage responsive means fails to supply sufficient potential to sustain gaseous ionization within the tube.

9. The combination of a gas-filled tube, a relay, a translating circuit, means for ionizing the gas within said tube, means responsive to the ionization of the gas within said tube for continuously vibrating the armature of the relay as long as the gas remains ionized, and means for continuously maintaining the translating circuit operated as long as the armature of the vibrating relay remains in vibration.

10. The combination of a gas-filled tube having input electrodes and output electrodes one of which is one of the input electrodes, means for applying a potential between the input electrodes for initiating ionization of the gas within the tube, a source of potential connected to the output terminals of the tube, the potential of said source being sufficient to sustain ionization of the gas within the tube between its output electrodes after ionization has been initiated between the input electrodes, means for periodically breaking the circuit connected to the output terminals, and means for absorbing the high voltage kick produced by each periodical breaking of the circuit connected to the output terminals of the tube.

11. The combination of a gas-filled tube having an input circuit and an output circuit, a relay connected to the output circuit of said tube, means responsive to a potential exceeding a predetermined value impressed upon the input circuit of said tube for initiating ionization of the gas within said tube and operating said relay, means for periodically breaking the output circuit of said tube and for maintaining said output circuit continuously broken after the potential impressed on the input circuit of the tube becomes reduced below the value required to sustain ionization of the gas within the tube, and means for maintaining the relay operated during the brief period between successive breaks in the output circuit.

12. The combination of a gas-filled tube having an input circuit and an output circuit, means for applying a potential to the input circuit to initiate and sustain gaseous ionization within the tube, a source of potential, a translating device operatively connected to the output circuit of the tube in a series circuit with the source of potential, means for periodically interrupting said series circuit for brief intervals, a condenser, and means for charging said condenser when said series circuit is closed and for discharging said condenser through the translating device during the brief intervals when the series circuit is open so as to maintain said translating device operated during said brief intervals.

13. The combination of a gas-filled tube having an input circuit and an output circuit, means responsive to received signals for intermittently applying potential to the input circuit of the tube so as to ionize the gas therein in accordance with said signals, a translating device, a source of potential connected in series with said translating device and the output circuit of said tube, said translating device being operated immediately after the gas within the tube has become ionized, means for periodically interrupting said series circuit so as to allow the enclosed gas to become de-ionized, each interruption of said series circuit being for a period of time which is greater than the de-ionizing time of the gas, and means for maintaining said translating device operated during the brief periods of interruption of said series circuit so that said translating device may remain operated as long as the gas within the tube remains ionized.

14. The method of signaling with a gas-filled tube having an input circuit and an output circuit, which consists in applying a potential exceeding a predetermined value to the input circuit of the tube to ionize the gas therein in accordance with a signal, producing a signal pulse in the output circuit of said tube while the gas within the tube is ionized, peridically interrupting the output circuit of the tube while the enclosed gas is ionized so as to allow the gas to become de-ionized immediately after the potential applied to the input circuit is removed without affecting the correspondence of the length of said signal pulse to the time during which said potential is applied to the input circuit of the tube, and substantially suppressing the high voltage kick occurring upon each periodical interruption of the output circuit.

15. The method of translating signal pulses with a gas-filled tube having an input circuit and an output circuit, which consists in applying potential exceeding a predetermined value to the input circuit of the tube in accordance with successive signal pulses in order to correspondingly ionize the enclosed gas during each pulse, producing corresponding signal pulses in the output circuit of the tube in accordance with the successive ionization of the enclosed gas, periodically interrupting the output circuit of the tube during each transmitted pulse so as to allow the gas to become de-ionized immediately after each pulse has been transmitted without affecting the correspondence between the signal pulses of the input circuit and the signal pulses of the output circuit, and substantially suppressing the high voltage kick occurring upon each periodical interruption of the output circuit of the tube.

16. The combination of a gas-filled tube having two cold cathodes and an anode, a source of potential, a translating device connected in series with said source of potential and the anode and one of the cathodes of said tube, a portion of the potential of said source being applied between said cathodes so as to bias one of the cathodes with respect to the other, and means for applying between said cathodes and effectively in series with the biasing potential a potential for ionizing the gas within said tube, said translating device being operated as long as the gas within said tube remains ionized.

17. The combination of a gas-filled tube having two cold cathodes and an anode, means responsive to a voltage exceeding a predetermined value applied between said cathodes for ionizing the gas within said tube, a translating device connected between the anode and one of said cathodes, means for periodically interrupting for brief intervals the circuit of said translating device, means for operating said translating device immediately after the gas within said tube has become ionized, means connected between the anode and the same cathode to which the translating device is connected for absorbing the voltage kick produced upon each opening of the circuit of said translating device, and means for maintaining said translating device operated during the brief intervals in which the circuit of said translating device is opened.

18. The combination of a gas-filled tube having two cathodes and an anode, a source of potential, an impedance connected between both cathodes of said tube, a vibrating relay, an operating relay, a condenser, a resistance connected in series with said condenser, the windings of both relays being connected in series with said source of potential between the anode and the mid-point of said impedance, the armature and contact of the vibrating relay being connected in shunt with said condenser and said resistance, said condenser and said resistance being also connected in shunt with the winding of the operating relay and said source of potential.

LELAND K. SWART.